United States Patent [19]

Burt

[11] Patent Number: 4,951,970

[45] Date of Patent: Aug. 28, 1990

[54] PROTECTIVE LABEL FORM AND METHOD

[76] Inventor: Dennis M. Burt, 2208 E. North Ave., Anderson, S.C. 29625

[21] Appl. No.: 250,526

[22] Filed: Sep. 29, 1988

[51] Int. Cl.[5] ........................ B42D 15/00; G09C 3/00

[52] U.S. Cl. ........................................ 283/67; 283/81; 283/79

[58] Field of Search ................... 282/9 R; 283/70, 79, 283/80, 81

[56] References Cited

U.S. PATENT DOCUMENTS

| | | | |
|---|---|---|---|
| 3,987,960 | 10/1976 | Gardiner | 283/79 X |
| 4,159,586 | 7/1979 | Blum | 283/81 X |
| 4,248,919 | 2/1981 | Davis | 282/8 A |
| 4,659,077 | 9/1987 | Pretre | 283/81 |
| 4,688,826 | 8/1987 | Hosoya | 283/79 |
| 4,790,563 | 12/1988 | Instance | 283/79 X |

FOREIGN PATENT DOCUMENTS

| | | | |
|---|---|---|---|
| 2730231 | 1/1979 | Fed. Rep. of Germany | 283/79 |

*Primary Examiner*—Paul A. Bell
*Attorney, Agent, or Firm*—Cort Flint

[57] ABSTRACT

A protective label form and carrier is disclosed which includes a carrier (A) having individual label forms (B) carried horizontally spaced on the carrier. Each label form (B) includes a first panel (C) and a copolanar panel (D) which pass between a platen of the printer in a single plane. A label (K) is releasably carried by panel (C) and is printed. As the labels pass continuously through the printer, serial printing of serial numbers and other matter is easily done. Once printed, the individual label forms (B) are removed, panel (D) folds over panel (C) by means of a hinge (F) provided by plastic film attached to a backside (34) of panel (C). A perforated marginal tab (G) separates from plastic film (E) to expose an adhesive alignment margin (26). Adhesive margin (26) adheres to the left margin of panel (C) so that plastic film (E) is evenly overlaid over label (K) as panel (D) is peeled off by pulling tab (G). Overlaid plastic film (E) and label (K) may then be removed by severing across a tear line (36) and removed from panel (C). The composite label (50) consisting of protective film (E) and label (K) may then be affixed to a product.

23 Claims, 3 Drawing Sheets

Fig. 8.
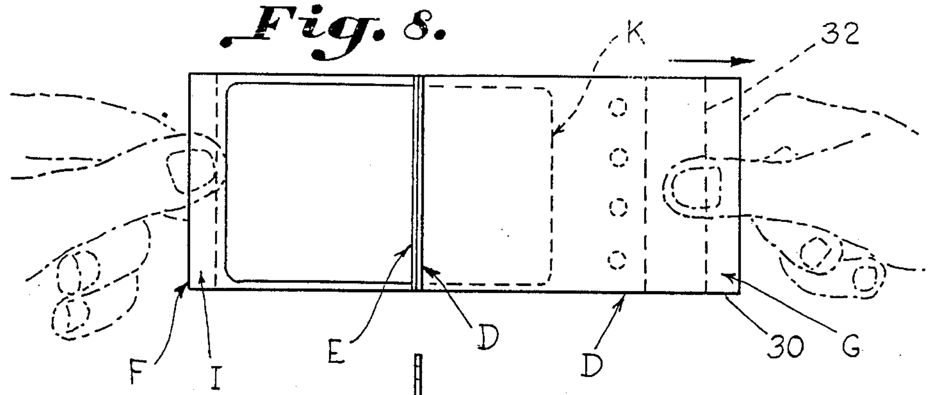
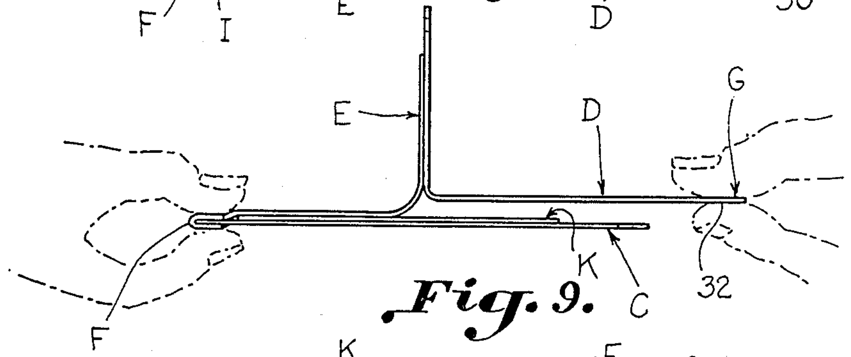
Fig. 9.
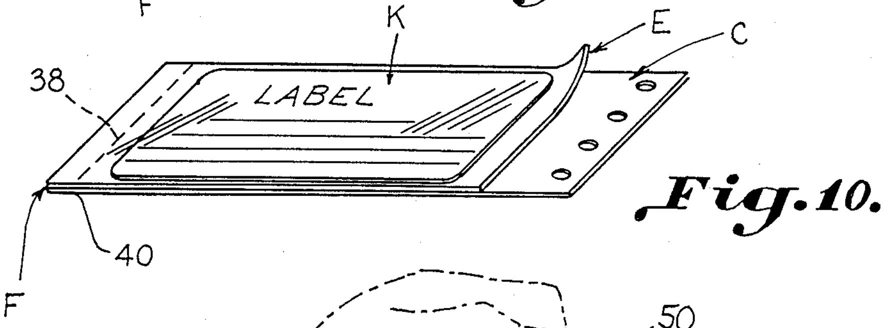
Fig. 10.
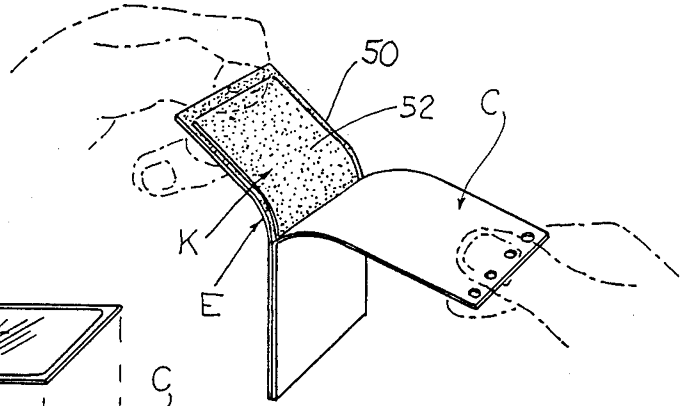
Fig. 11.
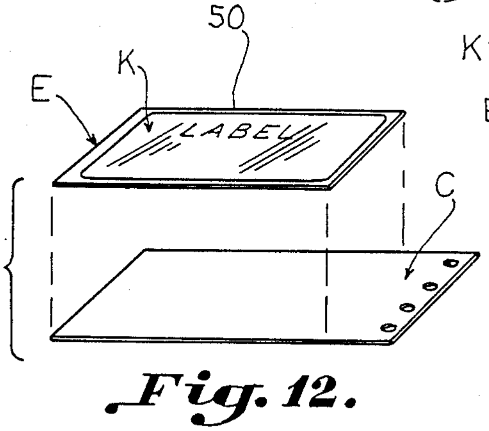
Fig. 12.

PROTECTIVE LABEL FORM AND METHOD

BACKGROUND OF THE INVENTION

The invention relates to a label form in which a label may be printed and covered with a protective film. In particular, the invention is directed to this label construction in which multiple labels are on a carrier that can be run through a computer printer and the like and serially printed prior to protective film covering.

In the manufacture of a wide variety of products, it is often necessary to produce variable data at the manufacturing and assembling site, like a name plate, for attachment to industrial products such as electric motors and compressors for refrigerators. In these manufacturing situations, it is not possible to determine in advance what the variable data will need to be so that it can be ordered ahead of time. There is not sufficient lead time to be able to go to the data processing room and print out name plates or labels as needed. Generally, industry has moved from metal tags which are stamped toward vinyl and polyester labels which will allow on the site printing. While the label material, i.e. polyester and vinyl, itself is very durable, the imprinted surface isn't and it won't stand up to a great deal of abrasion, weather, or use in a hostile environment. For example, in the automotive business a label may be used underneath a hood to put a serial number on a fuel injector or carburetor on site. The label will not withstand the harsh environment of the engine compartment unless it is laminated somehow. However, clear laminating film is very difficult to handle in individual pieces. The film is so flexible, it tends to jump and stick to itself instantly. To get the film smoothly laminated to a label is difficult. Even if dispensed from a roll, it is difficult to apply without wrinkling the film. Cutting the film to the proper length where it looks neat and creating a nice finished look is hard to achieve. Spraying and liquid laminations over labels are possible, but take more technique than is practical.

It is known to provide a clear label that is printed with information that includes an opaque protective outer layer having windows lined up with the printed information. However, this is a special label form with carbon carried on a backside so the printing is done by impact from the rear to print the label to show through the front window. This requires special equipment. U.S. Pat. No. 4,159,586 discloses a labeling system having multiple layers. A transparent cover sheet is provided with pressure sensitive adhesive on one surface. A separator sheet contacts the pressure sensitive adhesive and may be released. A label, carried on a releasable support panel, contacts the separator sheet of the transparent sheet. The transparent sheet may be folded back to write on an imprintable surface of the label. Afterwards, the separator sheet may be removed from the transparent sheet and the label covered with the transparent sheet for protection. U.S. Pat. No. 4,204,706 discloses a similar construction with multiple labels in a fan-folded construction. However, these label systems have superposed layers and neither system provides an imprintable surface on labels which can be carried between the platen of a computer printer and the like and covered with protective film. The transparent sheet and separator sheet of these prior art systems are folded over the face of the imprintable surface. U.S. Pat. No. 4,695,077 discloses a multiple layer label in which a protective film layer may be folded over printed information. However, the label construction is made to be applied on the inside of a windshield. The adhesive is on the front side of the protective sheet and label and would not be suitable for application in a reverse manner on a product. Neither is the multi-layered label construction suitable for continuous feeding through a computer printer and the like.

Accordingly, an object of the invention is to provide a protective label form having an imprintable surface which may be printed on a computer printer and the like and afterwards covered with a protective film which is part of the label form.

Another object of the invention is to provide a protective label carrier having a plurality of protective label forms which may be continuously and serially printed on a computer printer and the like and thereafter separated into individual label forms having a protective film which may be laid over the imprinted matter in a quick and reliable manner.

Another object of the invention is to provide a protective label form in which a pair of panels lie in a common plane for passage between a platen of a computer printer and the like and, afterwards, the imprinted panel is covered with a protective film which forms a part of the other panel.

Still another object of the invention is to provide a protective label form having a pair of panels with one having an imprintable surface and the other lying in the same plane during printing having a protective film which may overlay the printed matter after printing.

SUMMARY OF THE INVENTION

The above objectives are accomplished according to the invention by providing a carrier sheet on which a plurality of continuous label forms are carried. Each label form includes a first label panel and a second protective film panel carried coplanar for passage through a continuous printer. A front face of the printable panel and a backside of the protective film panel consist of releasable liner paper. A portion of the protective film joins the first panel to the second panel. After printing, the individual labels are separated from the carrier. The protective film panel is folded over the label panel and a margin of the protective film is adhered to the end of the label panel. The releasable film panel may then be removed from the film and, simultaneously, the protective film is evenly overlaid on the imprinted label. A composite protective label consisting of the film adhered to the label may be removed from the releasable label panel and adhered to a product.

In accordance with the present invention, the durability needed and the flexibility of imprinting variable data on a label is provided.

DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein:

FIG. 8 is a front plan view of a protective label form illustrating the protective film being applied over the imprinted surface;

FIG. 9 is a side elevation of the label of FIG. 8;

FIG. 10 is a perspective view illustrating the protective label form with protective film applied over the imprintable label surface prior to the label being detached from the form;

FIG. 11 is a perspective view illustrating the imprinted label and protective film being separated from the label form; and FIG. 12 is a perspective view illustrating the imprinted label and protective film removed from the label form.

DESCRIPTION OF THE PREFERRED EMBODIMENT

Figure 1:
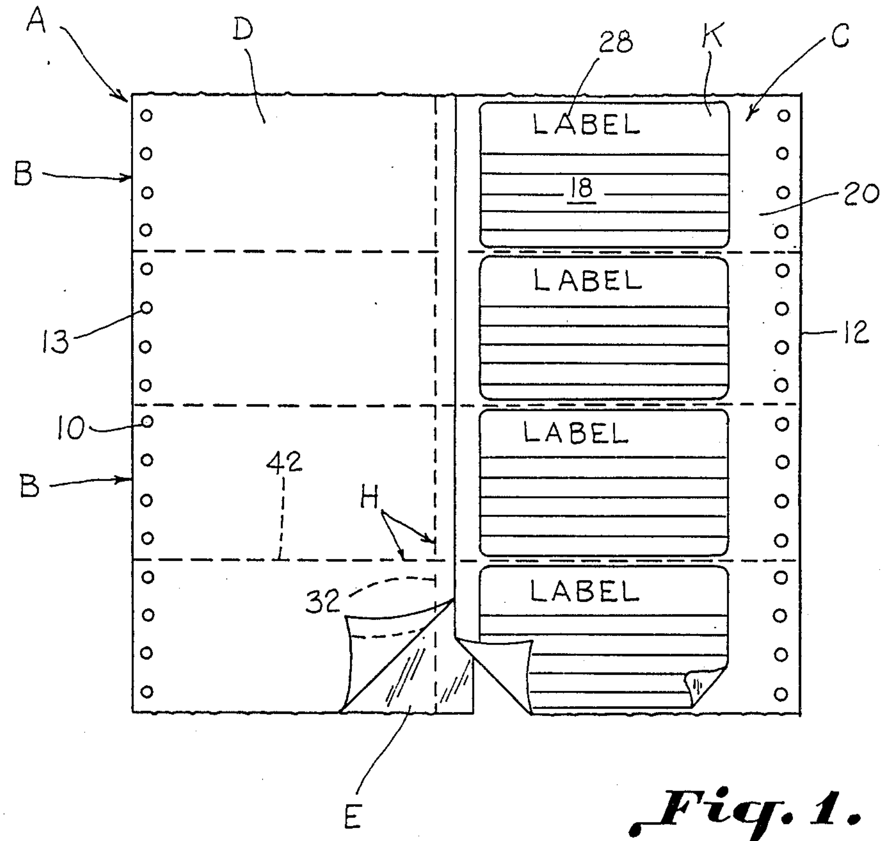
FIG. 1 is a front elevation of a protective label form and carrier constructed in accordance with the present invention.

Referring now in more detail to the drawings, a protective label system is illustrated for use in combination with a computer printer and the like having a plurality of labels which can be serially printed on the printer in a continuous manner. The labeling system includes a generally rectangular carrier sheet A having opposing side edges 10, 12. Carrier A has means for conveying the sheet between a platen and through a tractor feed of a printer (not shown) in the form of perforations 13. A plurality of protective label forms B are carried on carrier sheet A. Each label form includes a first panel C and a second panel D carried by the carrier sheet in an end-to-end juxtaposed manner extending horizontally between side edges 10, 12 of carrier sheet A. A first panel end 14 of panel C nearly abuts a second panel end 16 of panel D. An imprintable surface 18 is carried on a front face 20 of first panel C. A protective film layer E is carried on a backside 22 of second panel D. Imprintable panel C and protective film panel D are carried by carrier sheet A in a single, common plane for passage between the platen of a printer.

Figure 2:
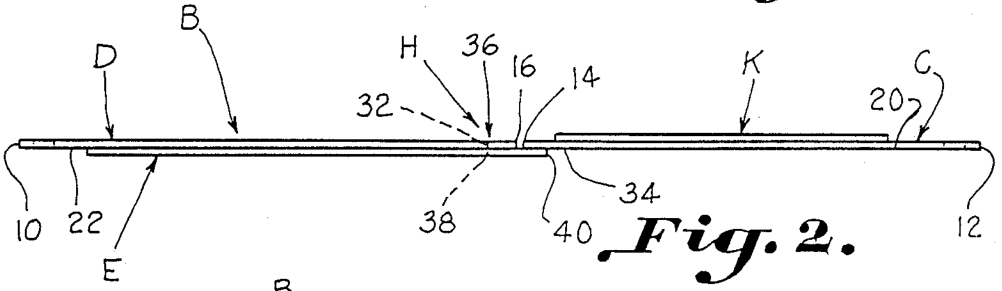
FIG. 2 is an end view of a single sheet of a protective label form and carrier constructed in accordance with the invention.
Figure 3:
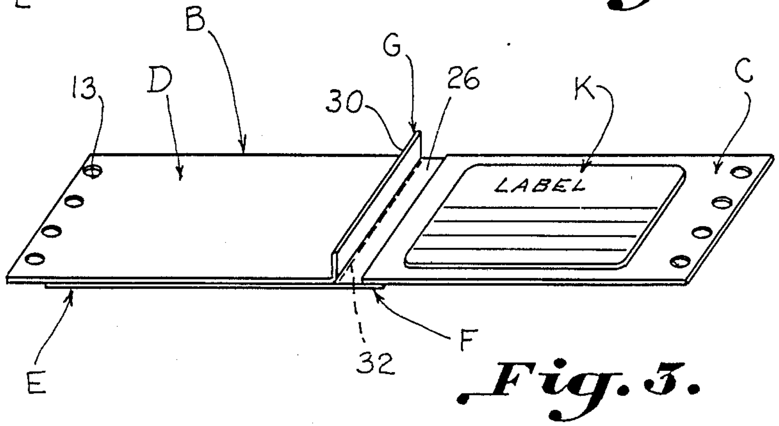
FIG. 3 is a perspective view of a protective label form with an alignment tab removed from the form for being grasped by the fingers.

As can best be seen in FIGS. 2 and 3, hinge means F is provided for joining the first and second panels together and for folding second panel D over first panel C. Marginal tab means G is included as part of second panel D for releasing the second panel from protective film layer E. When removed from the second panel, tab means G exposes an adhesive margin 26 of protective film E. Adhesive margin 26 aligns protective film E evenly as it is applied over panel C and imprinted surface 18. The protective film layer is overlaid upon imprintable surface 18 of the first panel C when second panel D is folded on the hinge means and panel C is removed. Separator means H is provided for separating the composite label imprintable surface and overlaid protective film layer from the carrier panel (FIG. 10).

Figure 4:
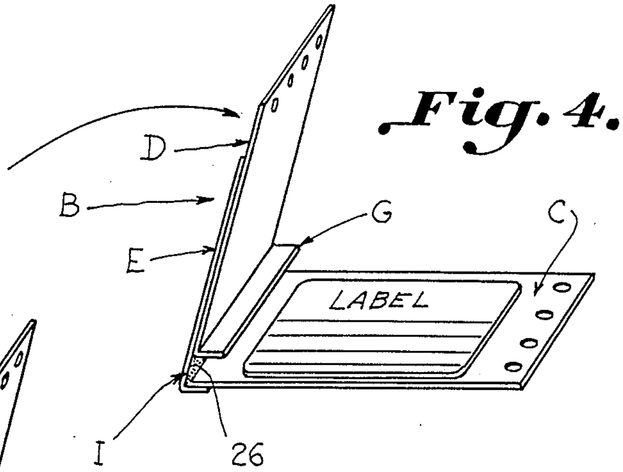
FIG. 4 is a perspective view of a composite label form in accordance with the invention with a second panel being folded about a hinge over a first panel having an imprintable surface.
Figure 5:
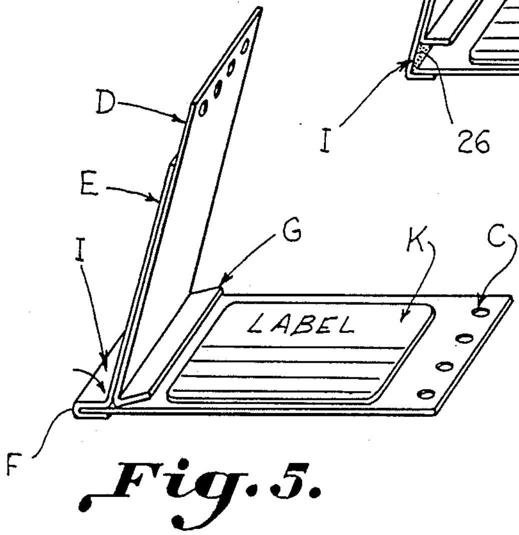
FIG. 5 is a perspective view illustrating a label with a marginal edge of a second panel being adhered to a marginal edge of a first panel for alignment of a protective film to be applied over the first panel.

Referring now in more detail to label form B, as can best be seen in FIGS. 1 and 2, label form B includes first panel C and second panel D lying in a common plane between the edges of carrier A so that the labels may pass between the platen of a printer for continuous printing of serially numbered labels. As can best be seen in FIGS. 3–7, margin alignment means I is provided for aligning protective film layer E over first panel C and imprintable surface 18 so that the protective film layer is laid evenly over a border of the imprintable surface. Margin alignment means includes adhesive margin 26 (FIGS. 3 and 4) on the marginal edge of protective film layer E transverse to a direction in which the protective film is applied over printed matter 28 on surface 18. The adhesive margin is exposed by releasing marginal tab means G (FIG. 3). Adhesive margin 26 adheres to first panel C at first panel end 14 when the protective film layer is folded over the first panel (FIGS. 5 and 9). Tab means G includes a marginal tab 30 formed at second panel end 16 by a perforated fold line 32 extending across a part of second panel D transverse to the direction in which protective film layer E is applied (FIGS. 1 and 2). Imprintable surface 18 on panel C is preferably provided by a removable label K carried on the front face of first panel, and the imprintable surface consists of an exterior surface of label K. The backside of second panel D and the front face of first panel C may include a releasable coating such as a silicon coating. It will be noted that the front face of second panel D may also include a printable surface for printing memos, etc., at the same time label K is being printed. Labels K are preferably polyester.

As can best be seen in FIG. 2, hinge means F is formed by protective film layer E attached to a backside 34 of first panel C and to backside 22 of front panel D. Separator means H for separating the composite of label K with protective film E overlaid includes a tear line 36 which is formed by perforations 38 across film layer E for severing the film layer and first panel C together across panel C. This leaves film E laminated over label K and the form panel C which is releasable liner panel material. The composite film and label is easily peeled off panel C (FIG. 12) for application to the product. Both the back of film E, its surrounding border, and label K have an adhesive coating for effective product adherence. Tear line 36 further includes a back edge 40 of film E adhered to the backside of panel C. Back edge 40 coincides with perforations 38 of film E adhered to the front face of panel C, as can best be seen in FIG. 10. When panel D is folded over panel C, perforations 38 and back edge 40 of film E provide for tearing straight across film E and panel C. Separator means H also includes a perforated tear line 42 between each label form so separating the individual label form of FIG. 3 from carrier A.

Figure 6:
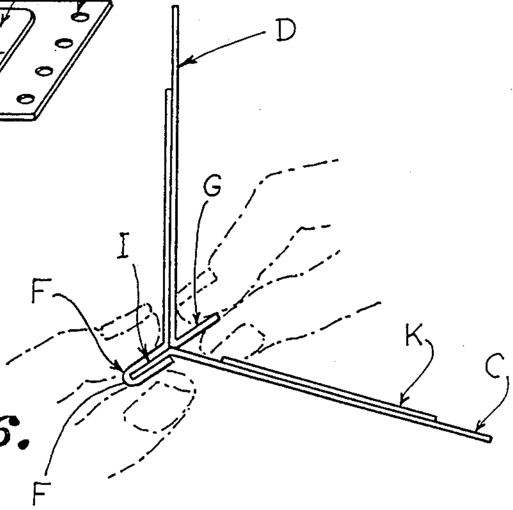
FIG. 6 is an elevation illustrating a marginal alignment tab of a protective label for applying a film over an imprinted surface according to the invention.
Figure 7:
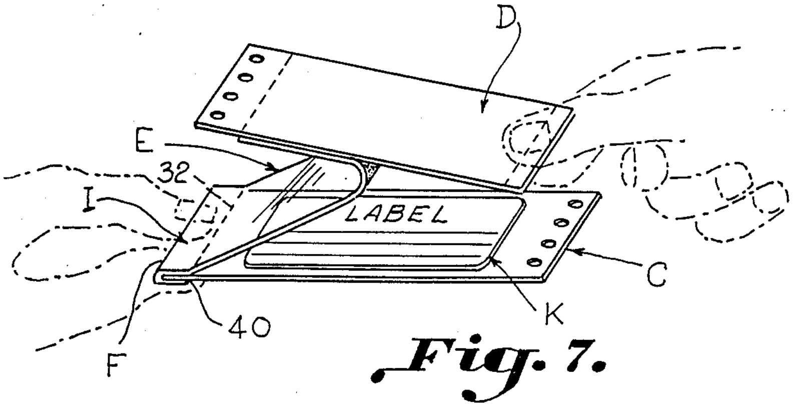
FIG. 7 is a perspective view illustrating the protective film being applied over the imprinted label while an alignment margin is held so that the film is applied evenly over the imprintable surface.

The application of the invention to producing composite protective labels, and particularly serially printed labels will now be described. Carrier A may be passed through a conventional printer by tractor feed perforations 13 or other means with labels K being serially printed with serial numbers and other product information. Then the individual label forms B may be separated from the carrier by perforations 42. Each label K is then removed and adhere to the product for which it is serially numbered in the following manner. Marginal tab G is released from protective film E (FIG. 3). Panel D is then folded over panel C with adhesive margin 26 adhered to the leftmost end of panel C (FIGS. 4–6). Panel D is then removed from protective film E by grasping marginal tab G and pulling panel D off of the film (FIGS. 7–9). As this happens, it can be seen that the edges of plastic film E will be flush with the edges of panel C. This is because the adhesive margin 26 has already been evenly applied to the end of panel C as panel D pivots about end 14 of panel C by means of the hinge provided by protective film E. With film E overlaid over label K, the border of film E surrounding label K adheres to the silicon coating of panel C (FIG. 10). The hinge portion of the composite label may now be severed by tearing the composite of film E on panel C across tear line 36, as can best be seen in FIGS. 10 and 11. With the hinge portion being severed, a composite 50 of film E and label K can be lifted off panel C which is a releasable liner (FIG. 12). Protective film E may be any clear plastic film. The protective film overlays label K completely covering and protecting the printed matter on the surface of the label. The plastic film is adhered evenly around the label and forms an even border around the label of clear film. Since the back 52 of the adhesive label and the back of the protective film are coated with adhesive, an enlarged adhesive surface is provided for adhering the label to the product.

In accordance with the invention, a method of producing serially printed labels comprises carrying a plurality of continuous label forms B having a first imprintable panel C and second juxtaposed panel D on label carrier A in a common plane on a carrier A (FIG. 1). The next step is passing carrier A through a printer with the first and second label panels flat. Information is printed on first panel C of the label form continuously and in series to provide desired serially printed labels. Next, the method contemplates separating the label forms from the carrier and folding the second panel over the first panel (FIG. 4). The second panel is removed from the carrier to expose a protective film E carried on a backside of the second panel (FIG. 7). An adhesive side of the protective film is applied over the printed information on the first label panel (FIG. 10). Finally, the method includes separating the protective film and covered printed information from the carrier (FIG. 12).

In the method, a tab (FIG. 3) is separated from the second panel prior to applying the protective film over the printed information on the first panel to expose a marginal alignment portion transverse to the direction in which the protective film is applied. The marginal alignment portion of said protective film is adhered to an end of the first panel to evenly align the protective film as it is applied over the printed information (FIGS. 5–6).

While a preferred embodiment of the invention has been described using specific terms, such description is for illustrative purposes only, and it is to be understood that changes and variations may be made without departing from the spirit or scope of the following claims.

What is claimed is:

1. A composite protective label on which matter may be printed by a computer printer and the like and said printed matter overlaid with a protective film for protection against deterioration of said printed matter comprising:

a first panel having a first panel end;

a second panel having a second panel end;

said first panel and said second panel being coplanar and joined to one another with said first panel end and second panel end adjacent one another;

an imprintable surface carried on a front face of said first panel;

a protective film layer carried on a backside of said second panel;

hinge means joining said first and second panels together and forming a hinge between said first panel end and said second panel end about which said second panel is folded over said first panel; and marginal tab means carried by said second panel for releasing a marginal portion of said second panel from said protective film layer to expose said film layer and by which said protective film layer is pulled over said imprintable surface on said first panel when said second panel is folded about said hinge means.

2. The device of claim 1 including border alignment means for aligning said protective film layer over said first panel and said imprintable surface so that said protective film layer is laid evenly over a border of said imprintable surface.

3. The device of claim 2 wherein said border alignment means includes an adhesive margin created on a marginal edge of said protective film layer transverse to a direction in which said protective film is applied over said printed matter, said adhesive margin being exposed by releasing said marginal tab means, and said adhesive margin adhering to said first panel at said first panel end when said protective film layer is folded over said first panel.

4. The device of claim 1 wherein said marginal tab means includes a marginal tab formed at said second panel end by a fold line extending across said second panel transverse to the direction in which said protective film layer is applied over said printed matter.

5. The device of claim 1 including a label carried on said front face of said first panel, said imprintable surface consisting of an exterior surface of said label.

6. The device of claim 5 wherein said backside of said second panel and said front face of said first panel include a releasable coating.

7. The device of claim 1 wherein said backside of said second panel includes a releasable coating.

8. The device of claim 1 wherein said hinge means is formed by said protective film layer attached to a backside of said first panel and to said back side of said front panel.

9. The device of claim 8 wherein a front face of said second panel faces the same direction as said front face of first panel, and said front face of said second panel is imprintable.

10. The device of claim 1 including tear line means formed across said protective film layer for severing across said film layer and said first panel together.

11. The device of claim 10 wherein said tear line means includes perforations formed across said protective film layer.

12. The device of claim 11 wherein said tear line means includes a terminal edge of said film on the backside of said first panel which coincides with said perforations of said film layer.

13. A protective label system for use with a computer printer and the like having a plurality of labels which can be serially printed on said printer in a continuous manner comprising:

a generally rectangular carrier having opposing edges for being fed through said printer;

a plurality of labels carried on said carrier, each said label including a first panel and a second panel carried by said carrier lying generally in a common plane between said edges of said carrier with a first panel end generally abutting a second panel end;

an imprintable surface carried on a front face of said first panel;

a protective film layer carried on a backside of said second panel;

hinge means joining said first and second panels together and forming a hinge between said first panel end and said second panel end about which said second panel is folded over said first panel;

marginal tab means carried by said second panel for releasing a marginal portion of said second panel from said protective film layer to expose said film layer and by which said protective film layer is pulled over said imprintable surface on said first panel when said second panel is folded about said hinge means; and means for separating said imprintable surface and overlaid protective film layer from said carrier.

14. The device of claim 13 includes margin alignment means having an adhesive margin created on a marginal edge of said protective film layer transverse to a direction in which said protective film is applied over said printed matter, said adhesive margin being exposed by releasing said marginal tab means, and said adhesive margin adhering to said first panel at said first panel end when said protective film layer is folded over said first panel.

15. The device of claim 13 wherein said marginal tab means includes a marginal tab formed at said second panel end by a fold line extending across said second panel transverse to the direction in which said protective firm layer is applied over said printed matter.

16. The device of claim 13 including a label carried on said front face of said first panel, said imprintable surface consisting of an exterior surface of said label.

17. The device of claim 13 wherein said hinge means is formed by said protective film layer attached to a backside of said first panel and to said back side of said front panel.

18. The device of claim 13 including tear line means formed across said protective film layer for severing across said film layer and said first panel.

19. The device of claim 18 wherein said tear line means includes a perforated tear line formed across said protective film layer and a back edge of said film generally coinciding with said tear line across said protective film layer.

20. A method of producing printed labels comprising:

carrying a plurality of continuous label forms on a label carrier having a first imprintable panel and a second juxtaposed panel;

passing said carrier through said printer with said first and second panels lying in a common plane;

printing information on said first panel of said label forms continuously and in series;

separating said label forms from said carrier;

folding said second panel generally over said first panel;

separating said second panel from said carrier to expose a protective film carried on a backside of said second panel;

applying an adhesive side of said protective film over said printed information on said first panel; and removing said protective film and said covered printed information as a unit.

21. The method of claim 15 including separating a tab from said second panel prior to applying said protective film over said printed information on said first panel, and adhering a marginal portion of said protective film to an end of said first panel to align said protective film as it is applied over said printed information.

22. A method of producing serially printed labels comprising:

carrying a plurality of continuous label forms having juxtaposed first and second panels on a label carrier;

printing information on said first panel of said label forms continuously and in series to provide desired serially printed labels;

separating said label forms from said carrier;

folding said second panel generally over said first panel;

removing said second panel to expose a protective film;

applying an adhesive side of said protective film over said printed label; and separating said printed label and protective film from said first panel.

23. The method of claim 16 including separating a tab from said second panel prior to applying said protective film over said printed information on said first panel to expose a marginal alignment portion transverse to the direction in which said protective film is applied, and adhering said marginal alignment portion of said protective film to an end of said first panel to align said protective film as it is applied over said printed information.

* * * * *